United States Patent
Gadde et al.

(10) Patent No.: US 12,500,393 B2
(45) Date of Patent: Dec. 16, 2025

(54) SEMICONDUCTOR LASER HAVING IMPROVED FACET RELIABILITY

(71) Applicant: MACOM Technology Solutions Holdings, Inc., Lowell, MA (US)

(72) Inventors: Akshitha Gadde, Ithaca, NY (US); Wolfgang Parz, Ithaca, NY (US); Yifan Jiang, Ithaca, NY (US); Jason Daniel Bowker, Ithaca, NY (US)

(73) Assignee: Macom Technology Solutions Holdings, Inc., Lowell, MA (US)

( * ) Notice: Subject to any disclaimer, the term of this patent is extended or adjusted under 35 U.S.C. 154(b) by 729 days.

(21) Appl. No.: 17/876,180

(22) Filed: Jul. 28, 2022

(65) Prior Publication Data
US 2024/0039239 A1   Feb. 1, 2024

(51) Int. Cl.
  *H01S 3/00*   (2006.01)
  *H01S 5/042*  (2006.01)
  *H01S 5/16*   (2006.01)
  *H01S 5/22*   (2006.01)
  *H01S 5/00*   (2006.01)
  *H01S 5/10*   (2021.01)

(52) U.S. Cl.
  CPC ............ *H01S 5/168* (2013.01); *H01S 5/0421* (2013.01); *H01S 5/04254* (2019.08); *H01S 5/22* (2013.01); *H01S 5/0035* (2013.01); *H01S 5/1039* (2013.01); *H01S 2301/176* (2013.01)

(58) Field of Classification Search
  CPC .... H01S 5/168; H01S 5/0421; H01S 5/04254; H01S 5/22; H01S 5/0035; H01S 5/1039; H01S 2301/176
  See application file for complete search history.

(56) References Cited

U.S. PATENT DOCUMENTS

| | | | |
|---|---|---|---|
| 2004/0218646 A1* | 11/2004 | Mihashi | H01S 5/2231 372/46.01 |
| 2005/0190416 A1* | 9/2005 | Yoneda | H01S 5/0201 359/27 |
| 2010/0296537 A1* | 11/2010 | Kotani | G11B 7/127 438/26 |
| 2011/0176568 A1* | 7/2011 | Satoh | H01S 5/0655 372/44.01 |
| 2015/0140710 A1* | 5/2015 | McLaurin | H01S 5/22 438/33 |
| 2015/0229108 A1* | 8/2015 | Steigerwald | H01S 5/04256 372/45.01 |

* cited by examiner

*Primary Examiner* — Kinam Park
(74) *Attorney, Agent, or Firm* — Darrow Mustafa PC

(57) ABSTRACT

Described herein are examples of improved semiconductor lasers having improved facet reliability for operation at high power and high current without significant change in device performance. The semiconductor laser may include a first semiconductor layer, an active layer, a second semiconductor layer sequentially adjacent to each other and arranged on a substrate, and a contact layer. In one example, the improved semiconductor laser may have a conductive contact less than the length of the semiconductor laser cavity and/or a dielectric layer arranged on at least one of the end portions of the contact layer.

17 Claims, 11 Drawing Sheets

SEMICONDUCTOR LASER HAVING IMPROVED FACET RELIABILITY

TECHNICAL FIELD

The subject matter described herein relates, in general, to semiconductor lasers and, more particularly, to high-powered continuous wave (CW) semiconductor lasers.

BACKGROUND

The background description provided is to present the context of the disclosure generally. Work of the inventors, to the extent it may be described in this background section, and aspects of the description that may not otherwise qualify as prior art at the time of filing are neither expressly nor impliedly admitted as prior art against the present technology.

Semiconductor lasers are typically realized on a wafer by epitaxially depositing multiple layers of semiconductor materials such as InP, GaAs, GaN, and ternary or quaternary semiconductor material on a wafer using Metalorganic Chemical Vapor Deposition (MOCVD) or Molecular Beam Epitaxy (MBE) deposition on a semiconductor substrate surface.

Subsequently, multiple semiconductor fabrication steps are applied to the wafer to realize a laser optical cavity containing an active device region with facets and metallic conductive contacts. Typically, facets are formed by cleaving or etching the semiconductor material. The application of an electrical potential allows for electrical current flow through the active region of the device, which causes photons to be emitted out of the facets.

However, some semiconductor lasers, such as high-power CW semiconductor lasers operating at high current and high power, such as 65 mW/320 mA at 85° C., have experienced a significant failure rate during their operation. Investigative analysis has revealed facet-related failures as the laser facet cannot handle high power and current density.

SUMMARY

This section generally summarizes the disclosure and is not a comprehensive explanation of its full scope or all its features.

In one embodiment, a semiconductor laser includes a substrate and a first semiconductor layer, an active layer, and a second semiconductor layer sequentially adjacent to each other and arranged on the substrate. A contact layer is arranged on a first portion of the first semiconductor layer, while a dielectric layer is arranged on a second portion of the first semiconductor layer. A conductive contact is arranged on at least portions of the contact layer and the dielectric layer and has a central area that is adjacent to the contact layer and a bond pad area that is adjacent to the dielectric layer. The length of the central area of the conductive contact is less than the length of the cavity of the semiconductor laser. By essentially pulling back a portion of the conductive contact such that the central area of the conductive contact is less than the length of the cavity, current density at the facet edges of the semiconductor laser is reduced, resulting in an improvement in the breakage current.

In another embodiment, a semiconductor laser includes a substrate and a first semiconductor layer, an active layer, and a second semiconductor layer sequentially adjacent to each other and arranged on the substrate. A contact layer is arranged on a first portion of the first semiconductor layer and has a central portion bounded by end portions along a length of the contact layer, while a dielectric layer is arranged on at least one of the end portions of the contact layer and a second portion of the first semiconductor layer. A conductive contact is arranged on the contact layer and the dielectric layer and is electrically connected to the central portion of the contact layer. By having the dielectric layer arranged on at least one of the end portions of the contact layer, current provided to the conductive contact is directed to more centralized portions of the contact layer. Like before, this generally results in reduced current density at the facet edges of the semiconductor, resulting in an improvement in the breakage current.

In yet another embodiment, a conductive contact for a semiconductor device includes a central area and a bond pad area. The length of the central area of the conductive contact is less than the length of the bond pad area of the conductive contact, essentially creating a pullback region. Again, by pulling back a portion of the conductive contact, current density at the edges of the semiconductor device is reduced, resulting in an improvement in the breakage current.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described herein are different examples of semiconductor lasers having improved facet reliability. As mentioned in the background section, some semiconductor lasers, especially those operating at high current and/or high power, may experience a significant failure rate due to facet-related failures. Disclosed herein are semiconductor lasers that either have a conductive contact less than the length of the semiconductor laser cavity and/or a dielectric layer arranged on at least one of the end portions of the contact layer. These variations generally result in reduced current density at the facet edges of the semiconductor laser, resulting in an improvement in the breakage current.

Figure 1:
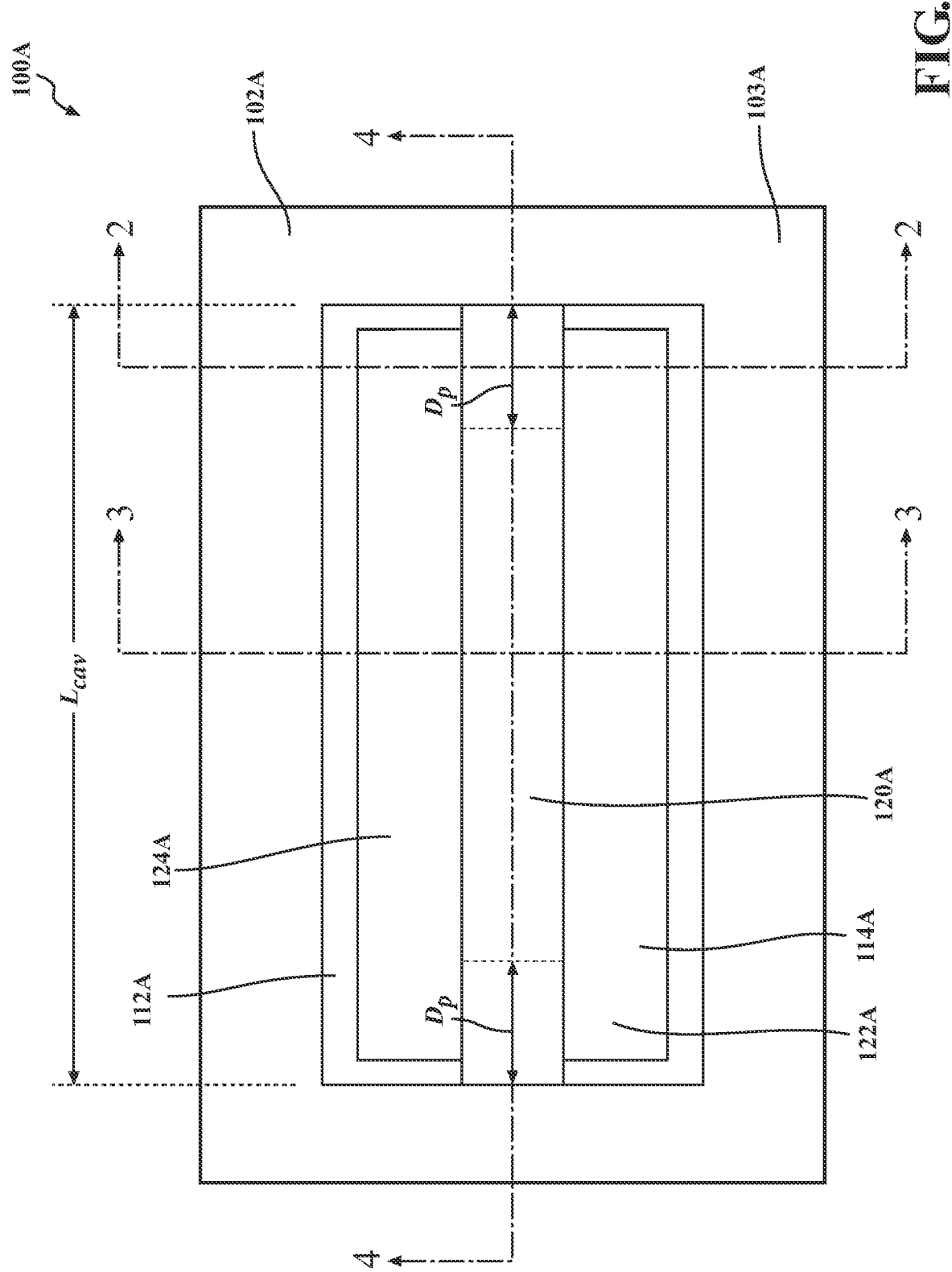
FIG. 1 illustrates a top view of a semiconductor laser having portions of a dielectric layer arranged on end portions of the contact layer.
Figure 2:
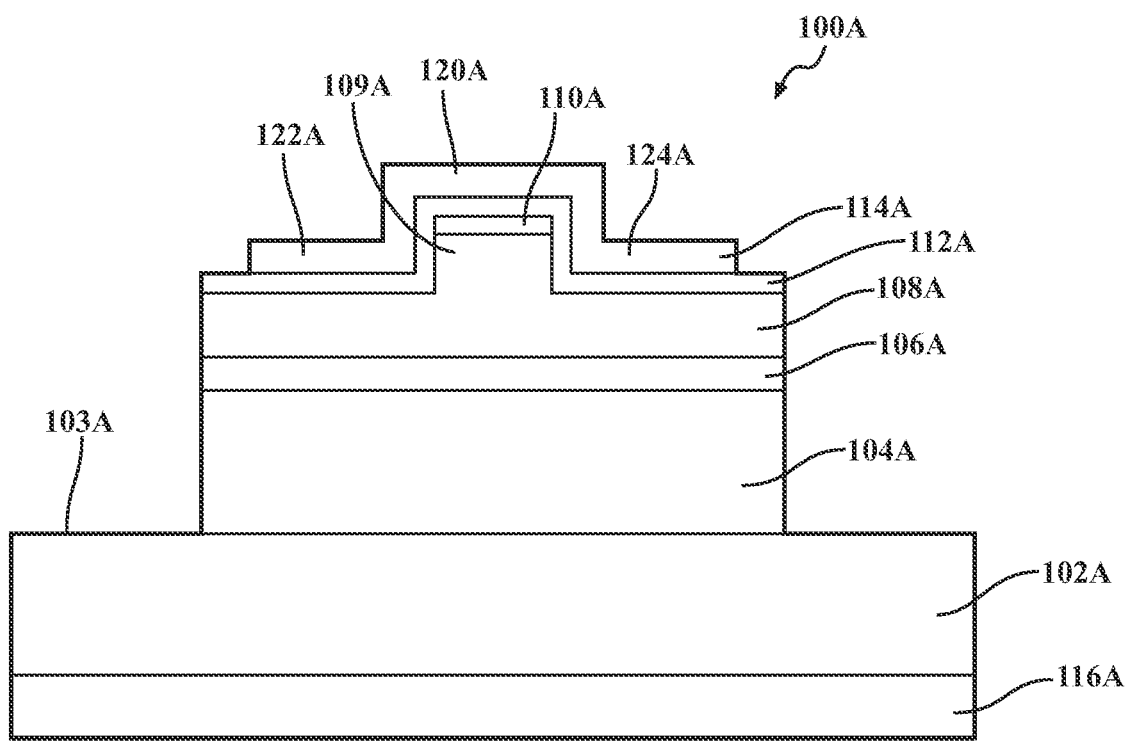
FIG. 2 illustrates a cutaway view of the semiconductor laser of FIG. 1, generally taken along lines 2-2 of FIG. 1.
Figure 3:
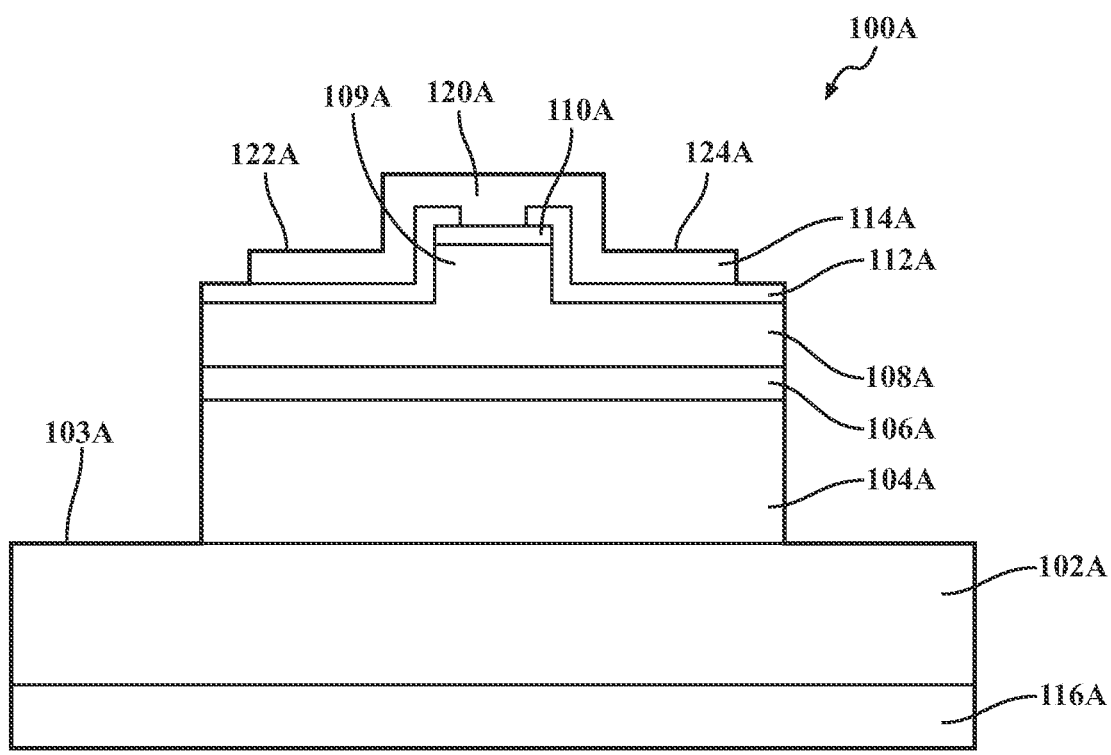
FIG. 3 illustrates another cutaway view of the semiconductor laser of FIG. 1, generally taken along lines 3-3 of FIG. 1.
Figure 4:
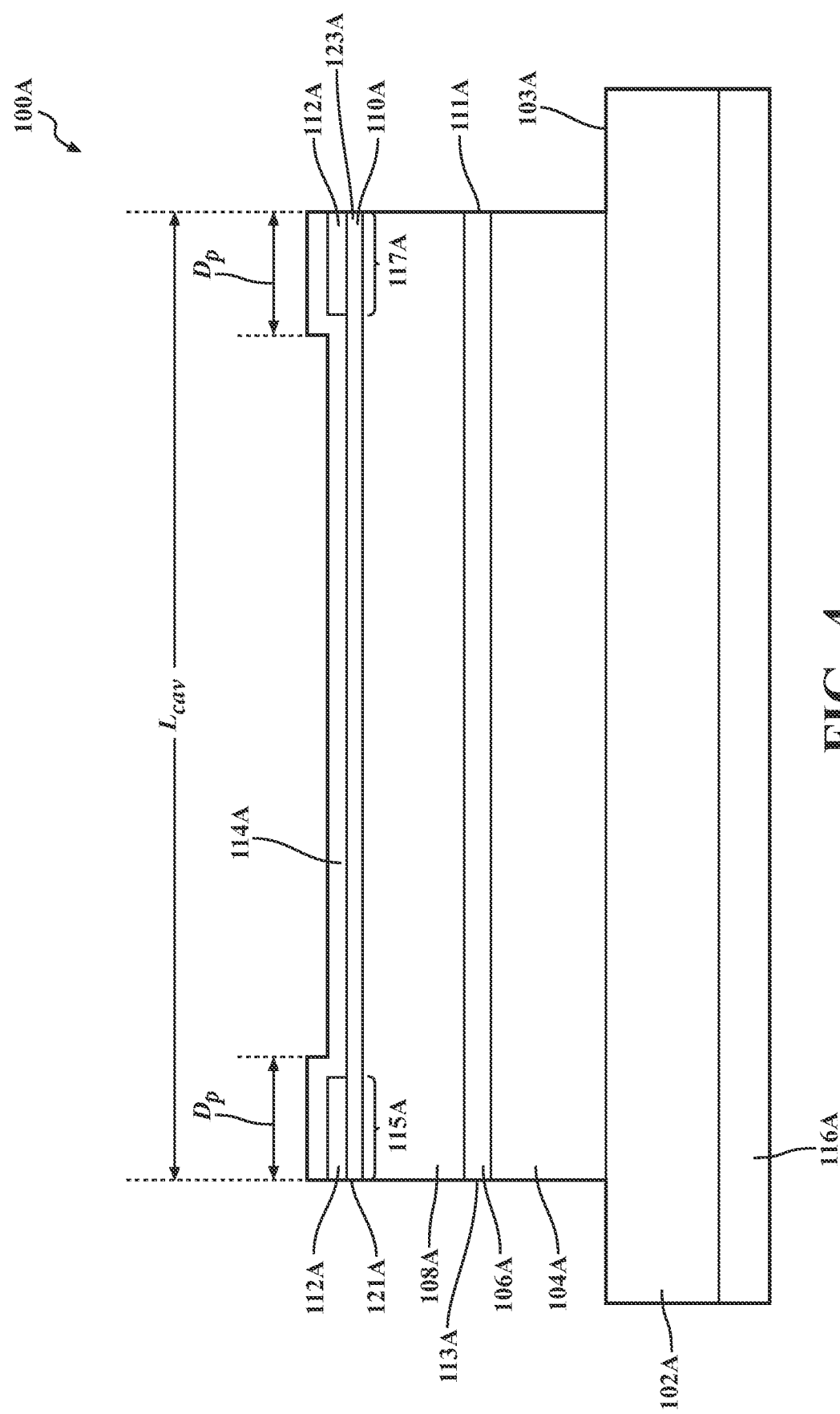
FIG. 4 illustrates another cutaway view of the semiconductor laser of FIG. 1, generally taken along lines 4-4 of FIG. 1.

Referring to FIGS. 1-4, illustrated are different views of one example of a semiconductor laser 100A. More specifically, FIG. 1 illustrates a top view of the semiconductor laser 100A, while FIGS. 2-4 illustrate different cutaway views, generally taken along lines 2-2, 3-3, and 4-4 of FIG. 1, respectively, of the semiconductor laser 100A. The semiconductor laser 100A can vary from application to application. For example, the semiconductor laser 100A could be a CW laser or could be a pulsed laser that produces a series of pulses at a certain pulse width and frequency.

In this example, the semiconductor laser 100A may be formed on a substrate 102A. The substrate 102A can be formed of any type of suitable material, for example, of a type III-V compound, or an alloy thereof, which may be suitably doped. In one example, the substrate 102A may include top surface 103A on which is deposited, as by an epitaxial deposition such as MOCVD or MBE, a succession of layers that form additional elements of the semiconductor laser 100A.

Moreover, arranged on the top surface 103A may be a first semiconductor layer 108A, an active layer 106A, and a second semiconductor layer 104A sequentially adjacent to each other. Moreover, the second semiconductor layer 104A may be directly adjacent to the top surface 103A of the substrate 102A. The active layer 106A may then be arranged on top of the second semiconductor layer 104A, while the first semiconductor layer 108A may then be arranged on top of the active layer 106A, essentially placing the active layer 106A between the first semiconductor layer 108A and the second semiconductor 104A. In one example, the first semiconductor layer 108A may be an P-type semiconductor. As to the second semiconductor layer 104A, this layer may be a N-type semiconductor and may include a ridge 109A.

The active layer 106A may provide for the emission of photons from the semiconductor laser 100A. Facets 111A and 113A may be formed at either end of the semiconductor laser 100A by cleaving or etching the active layer 106A. Applying an electrical potential allows electrical current to flow through the active layer 106A, which causes photons to be emitted out of the facets 111A and 113A. The length of the active layer 106A and/or the first semiconductor layer 108A and the second semiconductor 104A may be used to define the cavity distance or cavity length of the semiconductor laser 100A. In this example, the cavity distance or cavity length is defined by the length $L_{cav}$.

A contact layer 110A may be arranged on a portion of the first semiconductor layer 108A. In this example, the contact layer 110A is arranged above the ridge 109A of the first semiconductor layer 108A. In one example, the contact layer 110A may be a highly p-doped InGaAs layer. The contact layer may have a length substantially similar to the length $L_{cav}$.

The semiconductor laser 100A also includes a dielectric layer 112A arranged on a portion of the first semiconductor layer 108A. Generally, the dielectric layer 112A is made of an electrically insulating material, such as MgO, $MgF_2$, $SiO_2$, $Si_3N_4$, and/or other dielectrics. However, in addition to being arranged on portions of the first semiconductor layer 108A, the dielectric layer 112A may also be additionally arranged on end portions 115A and/or 117A of the contact layer 110A, as best shown in FIG. 4.

Moreover, FIGS. 1-4 illustrate distances $D_p$. The distances $D_p$ are the distances between the edges 121A and/or 123A along the length of the contact layer 110A that is covered by portions of the dielectric layer 112A. The distances $D_p$ may be substantially equal to each other (i.e., the length of the end portions 115A and 117A covered by the dielectric layer 112A). However, the distances $D_p$ may differ from each other. As will be explained in more detail later, the distances $D_p$, which are essentially the lengths of the end portions 115A and 117A, may be based on the desired power output of the semiconductor laser 100A. The distances $D_p$ may be approximately between 3 microns and 40 microns.

A conductive contact 114A is arranged on at least portions of the contact layer 110A and the dielectric layer 112A. In this example, the conductive contact 114A includes a central portion 120A that is adjacent to the contact layer 110A and is formed on top of the ridge 109A. The conductive contact 114 A also includes bond pad areas 122A and 124A that are adjacent to the dielectric layer 112A and are generally not located above the ridge 109A. The conductive contact 114A is generally made of a conductive material so that a current may be provided to the bond pad areas 122A and/or 124A. A corresponding second conductive contact 116A may be located adjacent to the substrate 102A. When an appropriate current is provided to the bond pad areas 122A and/or 124A, the active layer 106A emits photons.

As mentioned previously, some semiconductor lasers, especially those operating at high current and/or high power, may experience a significant failure rate due to facet-related failures. However, the semiconductor laser 100A is constructed such that the end portions 115A and 117A of the contact layer 110A are covered by the dielectric layer 112A. By covering the end portions 115A and 117A of the contact layer 110A as described, current density at the facet edges of the semiconductor laser 100A is reduced, resulting in an improvement in the breakage current. This results in a semiconductor laser with a longer operating life and improved power output compared to prior art systems.

Figure 5:
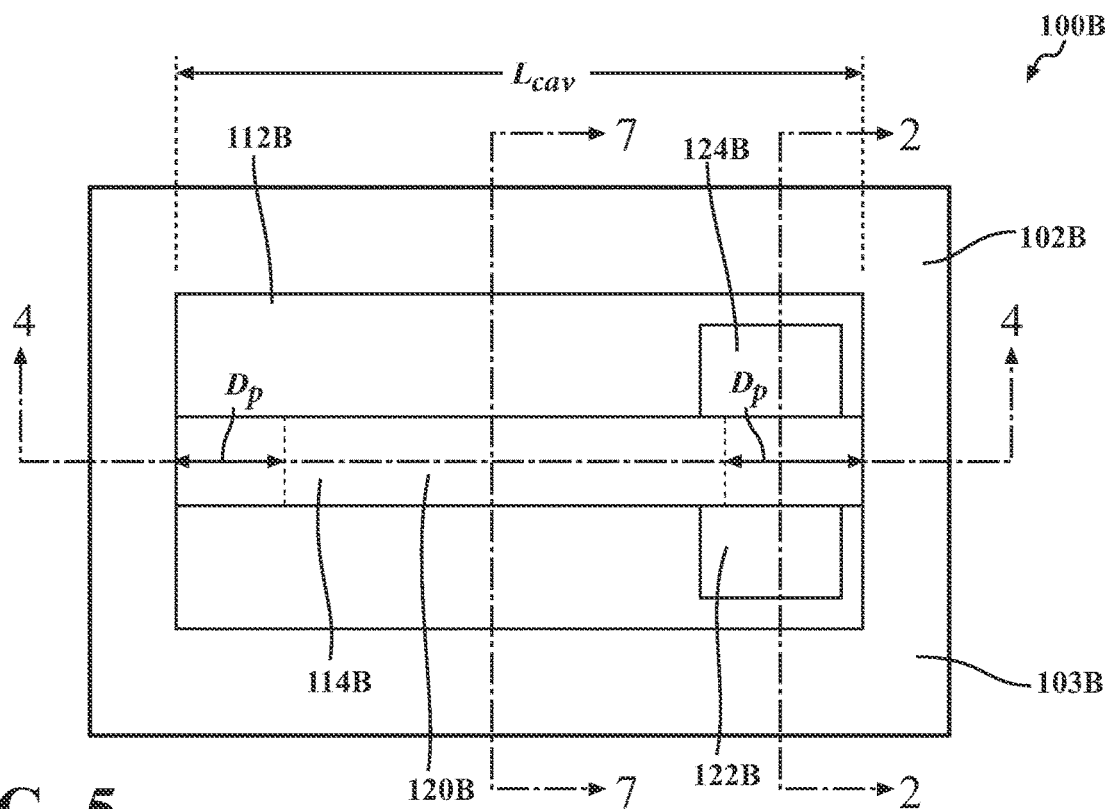
FIGS. 5 and 6 illustrate variations of the semiconductor laser of FIG. 1, wherein the conductive contact has smaller bond pad areas or a single bond pad area, respectively.
Figure 6:
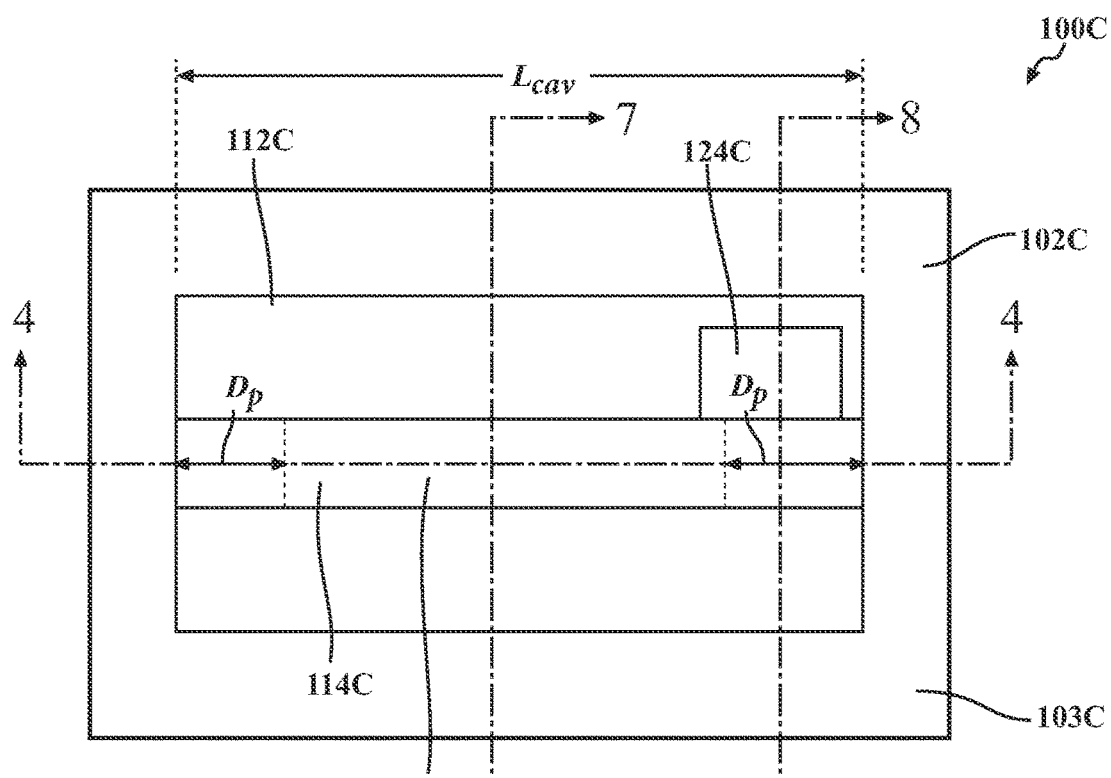

The semiconductor laser 100A can take a variety of different forms. As mentioned before, the semiconductor laser 100A is a ridge laser. However, the semiconductor laser 100A can also take other forms, such as a planar semiconductor layer. Additionally, other components of the semiconductor laser 100A may also vary as well. For example, the conductive contact 114A can vary in size and shape. For example, FIGS. 5 and 6 illustrate different examples of how the conductive contact can vary. In the examples illustrated in FIGS. 5 and 6, the conductive contact is referred to as conductive contact 114B and 114C, respectively.

Additionally, regarding these examples, like reference numerals have been utilized to refer to like elements (e.g., semiconductor laser 100A is similar to semiconductor laser 100B/100C, etc.) As such, previous descriptions of these elements in the paragraphs above are equally applicable to the examples shown in FIGS. 5 and 6. Therefore, no additional description of these elements will be provided.

Referring to FIG. 5, illustrated is a top view of a semiconductor laser 100B. In this example, the conductive contact 114B has a central portion 120B and bond pad areas 122B and 124B. In this example, the length of the central portion 120B is significantly longer than the bond pad areas 122B and 124B. In comparison, the length of the bond pad areas 122A and 124A and the central portion 120A are generally similar.

Figure 7:
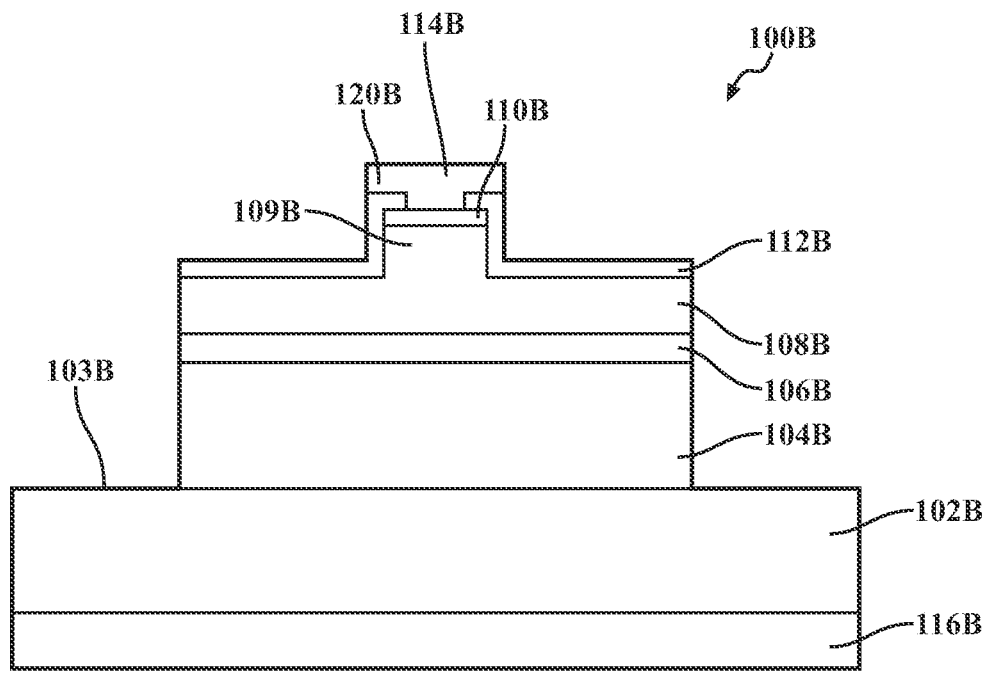
FIG. 7 illustrates a cutaway view of the semiconductor lasers of FIGS. 5 and 6, generally taken along lines 7-7 of FIGS. 5 and 6.

Cross-sectional views of the semiconductor laser 100B across the bond pad areas 122B and 124B would be similar to the cross-sectional views previously shown and described in FIG. 2. In like manner, the cross-sectional view across the length of the semiconductor laser 100B would be similar to the cross-sectional views previously shown and described in FIG. 4. However, the cross-sectional view across the center of the semiconductor laser 100B would differ, as shown in FIG. 7. Moreover, FIG. 7, which is a cross-sectional view generally taken along the lines 7-7 of FIG. 5, illustrates the presence of the central portion 120B of the conductive contact 114B, but not the presence of the bond pad areas 122B and 124B, as the bond pad areas 122B and 124B are substantially shorter in length and do not extend where that cross-sectional view is delineated.

Figure 8:
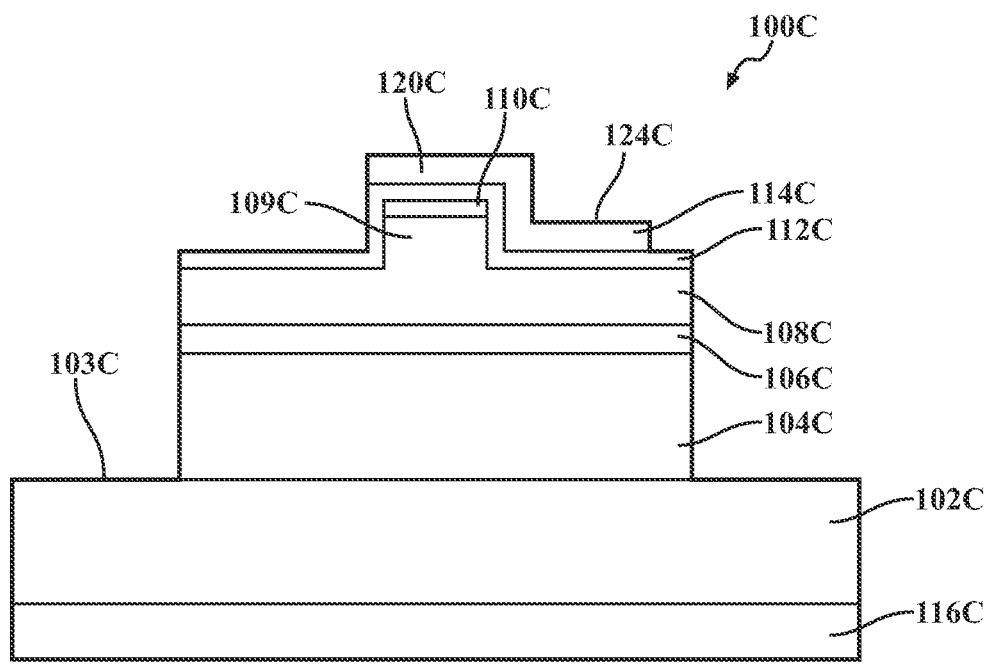
FIG. 8 illustrates a cutaway view of the semiconductor laser of FIG. 6, generally taken along lines 8-8 of FIG. 6.

FIG. 6 illustrates an example where the conductive contact 114C includes a lengthy central portion 120C, but only includes one bond pad area. In this example, the conductive contact 114C includes the bond pad area 124C. Generally, the cross-sectional view across the length of the semiconductor laser 100C would be similar to the cross-sectional views previously shown and described in FIG. 4. Additionally, the cross-sectional view across the middle of the semiconductor laser 100C would be similar to the cross-sectional views previously shown and described in FIG. 7. However, the cross-sectional view generally taken along lines 8-8 would differ from those in the other examples generally taken along lines 2-2. Moreover, FIG. 8 illustrates a cross-sectional view generally taken along lines 8-8 of the semiconductor laser 100C. This example shows that the conductive contact 114C only includes the central portion 120C and a single bond pad area 124C.

As such, the semiconductor lasers 100A-100C illustrated in FIGS. 1-9 have end portions 115A-115C and 117A-117C of their contact layers 110A-110C covered by the dielectric layers 112A-112C, respectively. As previously mentioned, by covering the end portions 115A-115C as described, current density at the facet edges of the semiconductor lasers 100A-100C is reduced, resulting in an improvement in the breakage current.

However, instead of and/or in addition to covering portions of the contact layer with a dielectric layer to improve longevity and performance, portions of the conductive contact can be pulled back or shortened such that they do not extend to the edge of the contact layer. FIGS. 9-12 illustrate one example of a semiconductor laser 200A that utilizes a pulled back conductive contact. Like reference numerals have been utilized to refer to like elements and any previous description of these elements applies to this example. For example, descriptions previously given regarding elements 102A, 104A, 106A are equally applicable to elements 202A, 204A, 206A, etc.

Figure 9:
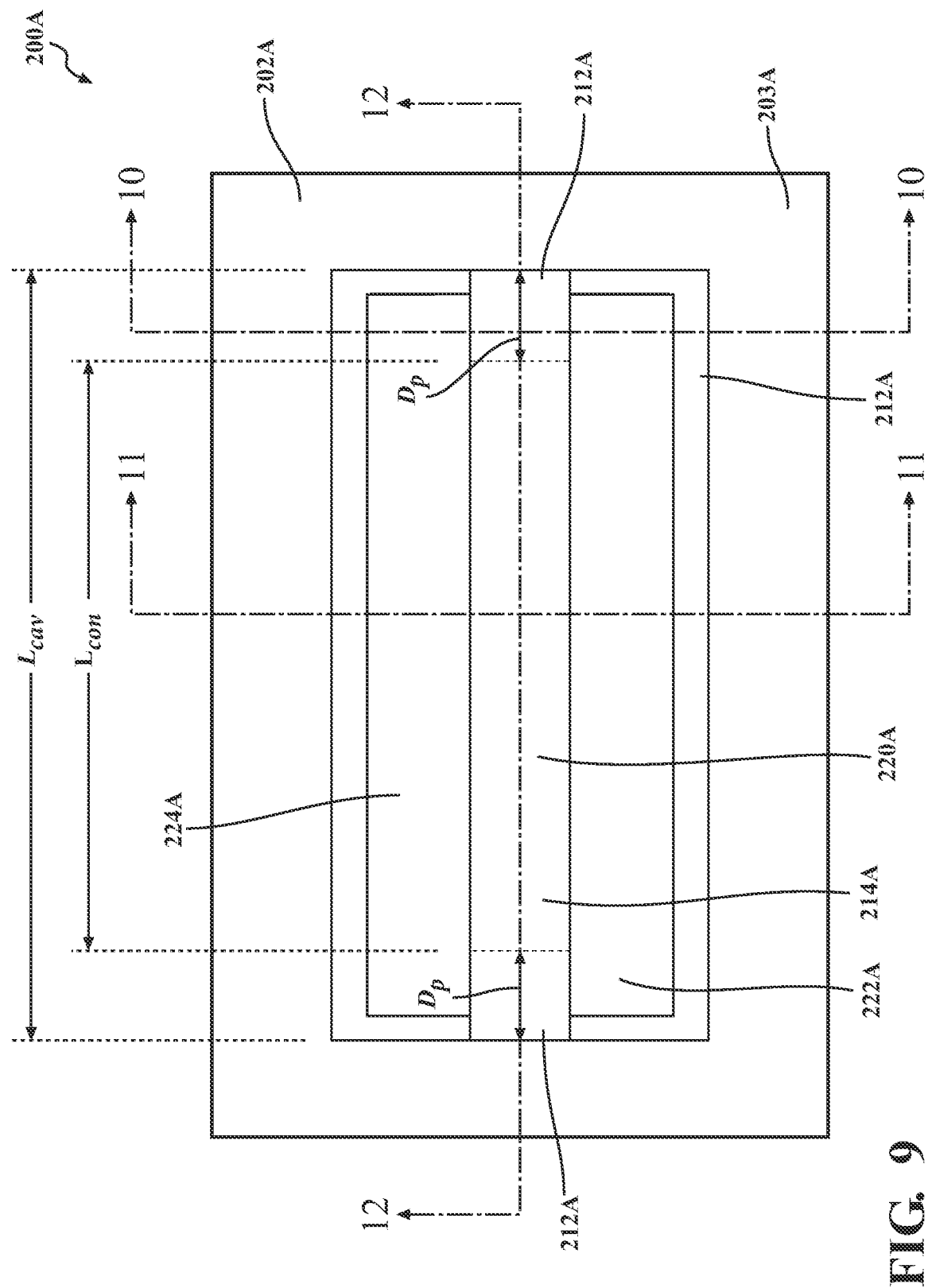
FIG. 9 illustrates a top view of a semiconductor laser, wherein a central area of a conductive contact is less than the length of the cavity of the semiconductor laser.
Figure 10:
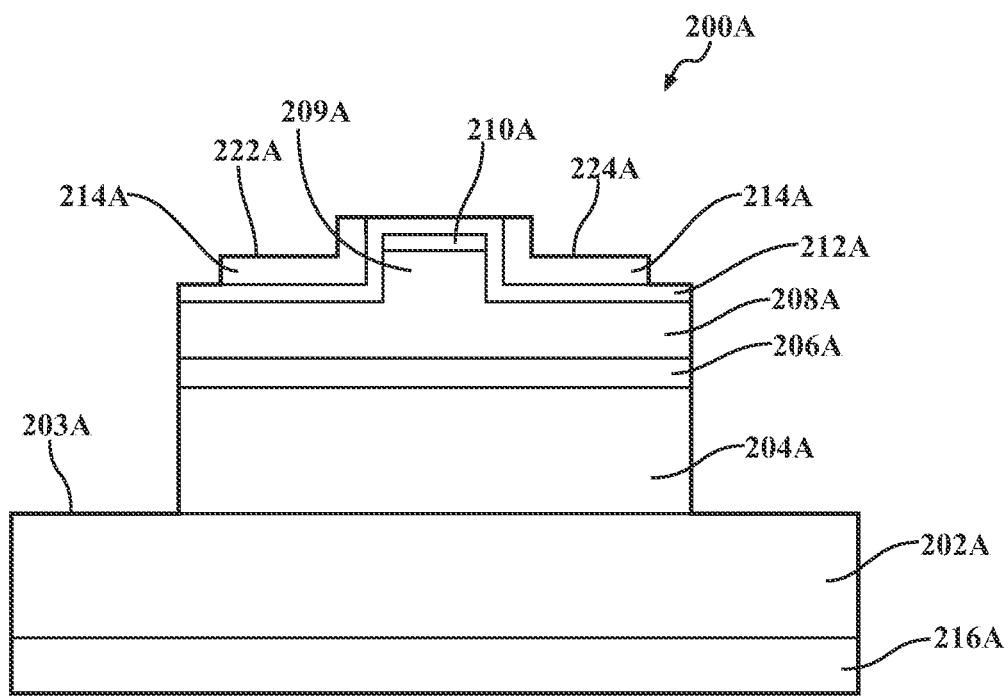
FIG. 10 illustrates a cutaway view of the semiconductor laser of FIG. 9, generally taken along lines 10-10 of FIG. 9.
Figure 11:
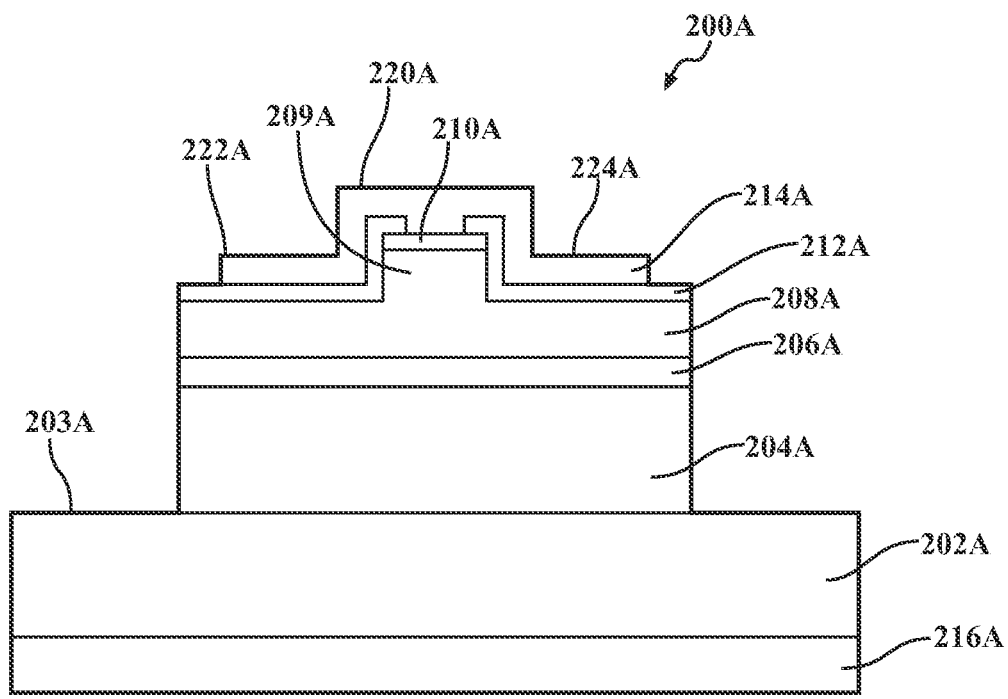
FIG. 11 illustrates another cutaway view of the semiconductor laser of FIG. 9, generally taken along lines 11-11 of FIG. 9.
Figure 12:
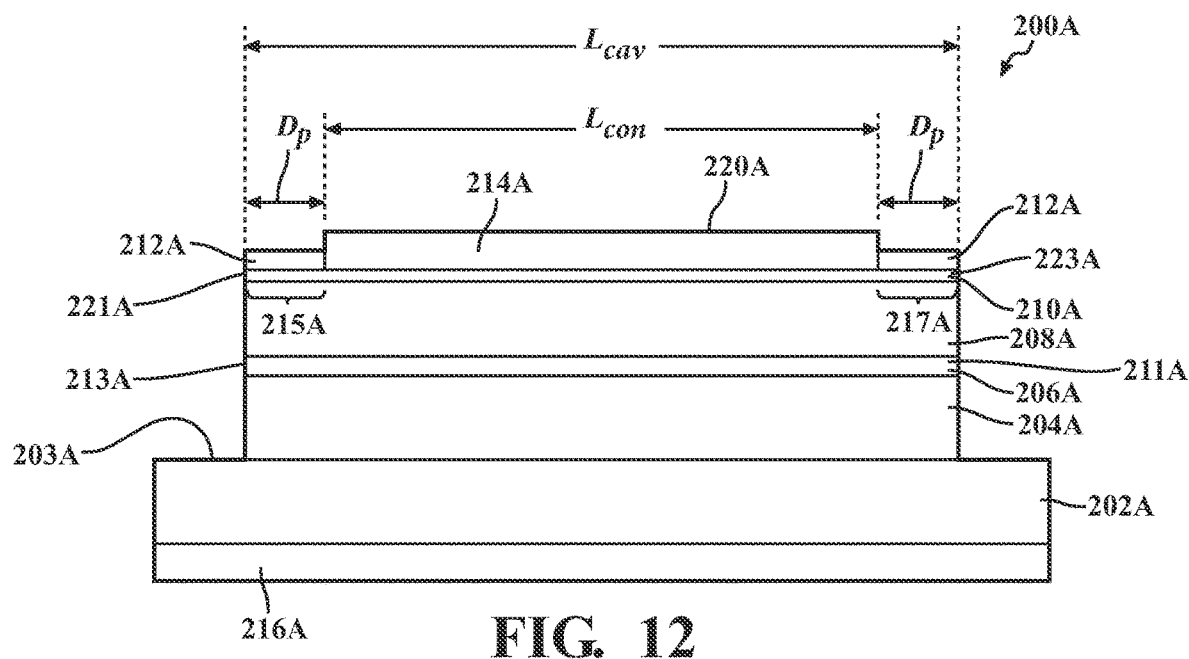
FIG. 12 illustrates another cutaway view of the semiconductor laser of FIG. 9, generally taken along lines 12-12 of FIG. 9.

FIG. 9 illustrates a top view of the semiconductor laser 200A, while FIGS. 10-12 illustrate different cutaway views, generally taken along lines 10-10, 11-11, and 12-12 of FIG. 9, respectively. As explained when describing the semiconductor laser 100A, the semiconductor laser 200A includes a substrate 202A with a first semiconductor layer 208A, an active layer 206A, and a second semiconductor 204A layer sequentially adjacent to each other and formed on the top surface 203A of the substrate 202A. Like the examples given before, applying an electrical potential allows electrical current to flow through the active layer 206A, which causes photons to be emitted out of the facets 211A and 213A.

A contact layer 210A may be arranged on a portion of the first semiconductor layer 208A. In this example, the contact layer 210A is arranged above the ridge 209A of the first semiconductor layer 208A. The semiconductor laser 200A also includes a dielectric layer 212A arranged on a portion of the first semiconductor layer 208A.

A conductive contact 214A is arranged on at least portions of the contact layer 210A and the dielectric layer 212A. In this example, the conductive contact 214A includes a central portion 220A that is adjacent to the contact layer 210A and is formed on top of the ridge 209A. The conductive contact 214A also includes bond pad areas 222A and 224A that are adjacent to the dielectric layer 212A and are generally not located above the ridge 209A.

In this example, the length $L_{con}$ of the central portion 220A of the conductive contact 214A is less than the cavity length $L_{cav}$ of the semiconductor laser 200A. Moreover, the central portion 220A of the conductive contact 214A may be such that it is essentially pulled back or at a distance $D_p$ from the edges 221A and/or 223A of the contact layer 210A. As such, end portions 215A and 217A of the contact layer 210A are not covered with portions of the conductive contact 214A. The distances $D_p$ from the edges 221A and/or 223A may be substantially similar to each other or may differ. Generally, like before, the distances are based on the desired power output of the semiconductor laser 200A and may be approximately between 3 microns and 40 microns.

As such, the cross-sectional view taken along lines 10-10 of the semiconductor laser 200A and shown in FIG. 10 illustrates that central portion 220A of the conductive contact 214A is not located above the contact layer 210A. However, the cross-sectional view taken along lines 11-11 across the middle of the semiconductor laser 200A shown in FIG. 11 illustrates that the central portion 220A of the conductive contact 214A is located above the contact layer 210A in these areas.

It has been observed that by pulling back portions of the central portion 220A of the conductive contact 214A, current density at the facet edges of the semiconductor laser 200A is reduced, resulting in an improvement in the breakage current. Like before, this results in a semiconductor laser with a longer operating life and improved power output compared to prior art systems.

Like the semiconductor laser 100A, the semiconductor laser 200A can take various forms. For example, the semiconductor laser 200A is a ridge laser. However, the semiconductor laser 200A can also take other forms, such as a planar semiconductor layer. Also, other components of the semiconductor laser 100A may vary as well, such as the conductive contact 214A. Moreover, similar to the variations of the semiconductor laser 100A illustrated in FIGS. 5 and 6, the semiconductor laser 200A may have its conductive contacts modified.

Figure 13:
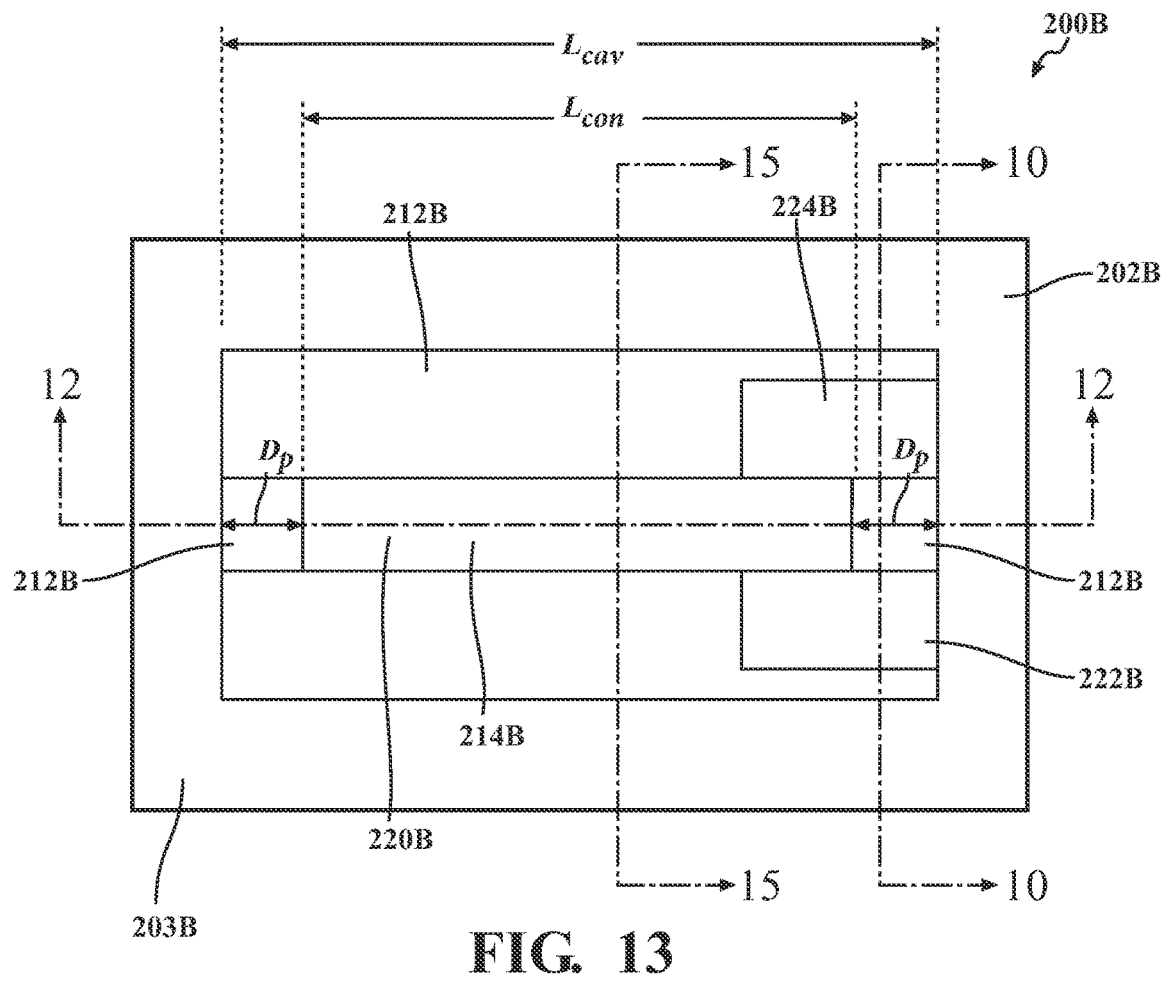
FIGS. 13 and 14 illustrate variations of the semiconductor laser of FIG. 9, wherein the conductive contact has smaller bond pad areas or a single bond pad area, respectively.

For example, referring to FIG. 13, illustrated is a top view of a semiconductor laser 200B. As before, like reference numerals have been utilized to refer to like elements. In this example, the conductive contact 214B has a central portion 220B and bond pad areas 222B and 224B. In this example, the length of the central portion 220B is significantly longer than the bond pad areas 222B and 224B.

Figure 15:
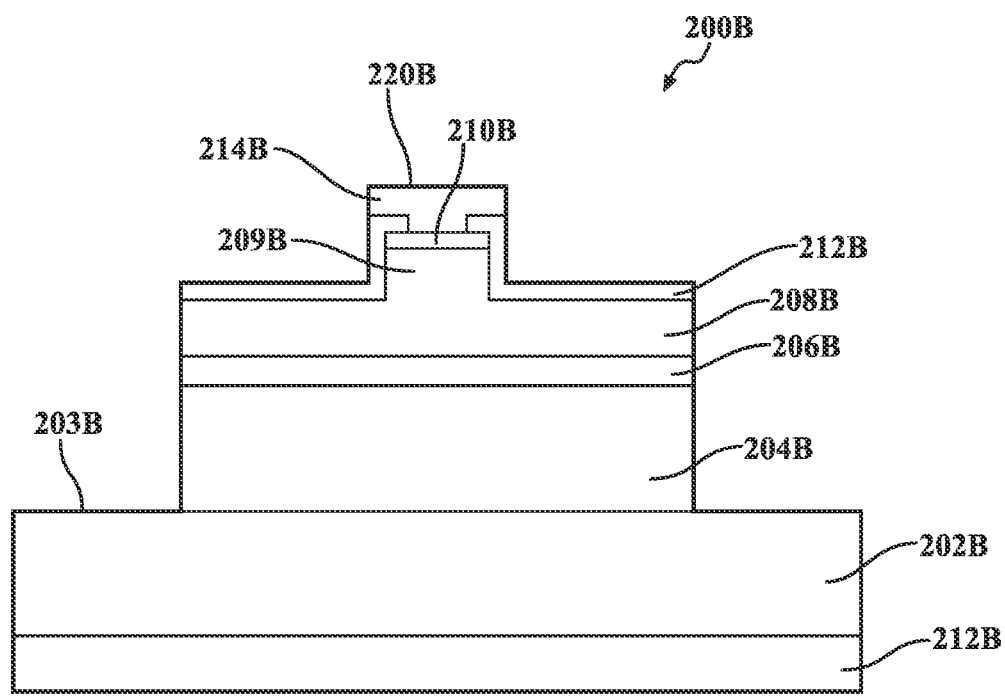
FIG. 15 illustrates a cutaway view of the semiconductor lasers of FIGS. 13 and 14, generally taken along lines 15-15 of FIGS. 13 and 14.

Cross-sectional views of the semiconductor laser 200B across the bond pad areas 222B and 224B would be similar to the cross-sectional views previously shown and described in FIG. 10. In like manner, the cross-sectional view across the length of the semiconductor laser 100B would be similar to the cross-sectional views previously shown and described in FIG. 4. However, the cross-sectional view across the center of the semiconductor laser 200B would differ, as shown in FIG. 15. Moreover, FIG. 15, which is a cross-sectional view generally taken along the lines 15-15 of FIG. 13, illustrates the presence of the central portion 220B of the conductive contact 214B, but not the presence of the bond pad areas 222B and 224B, as the bond pad areas 222B and 224B are substantially shorter in length and do not extend where that cross-sectional view is delineated.

Figure 14:
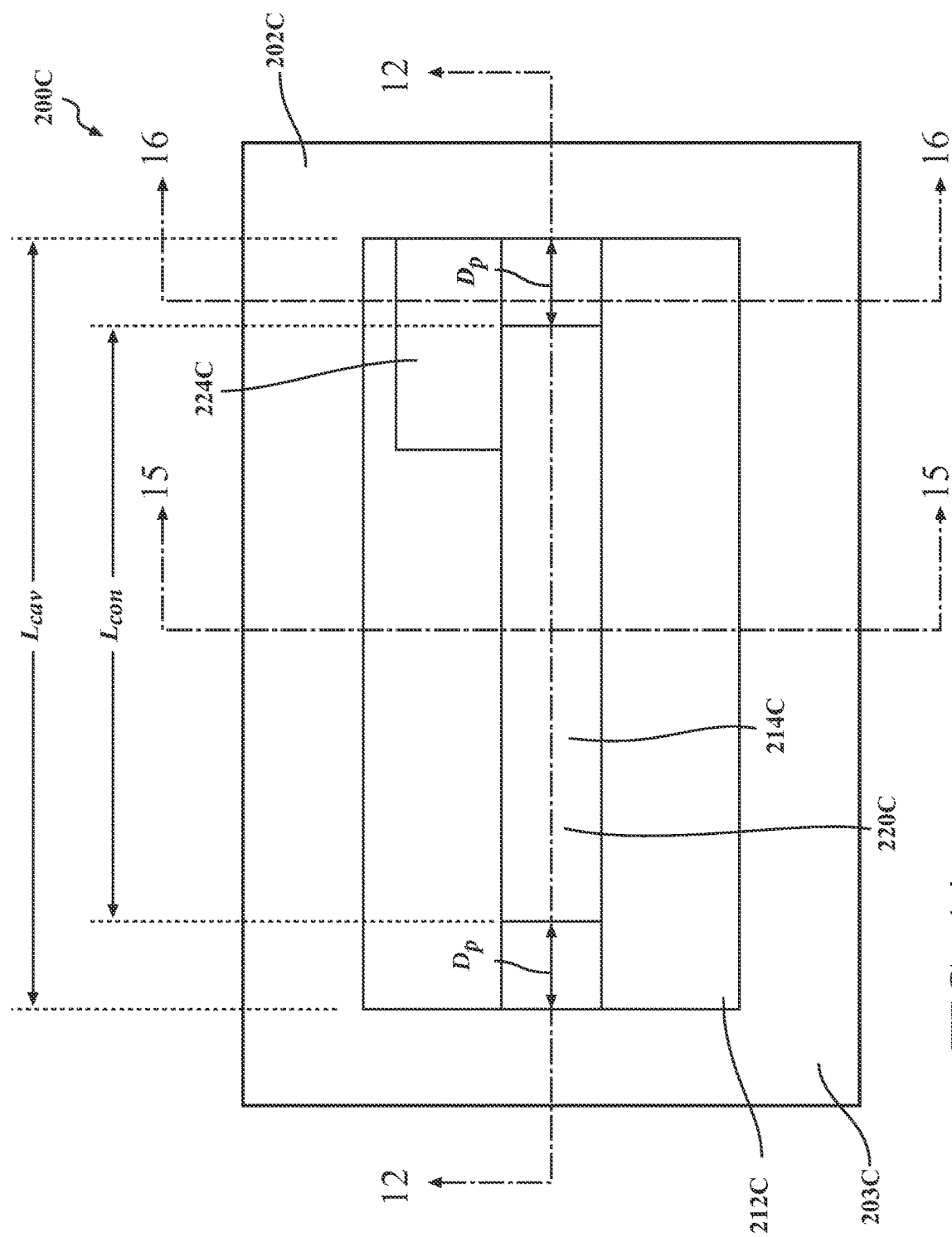
Figure 16:
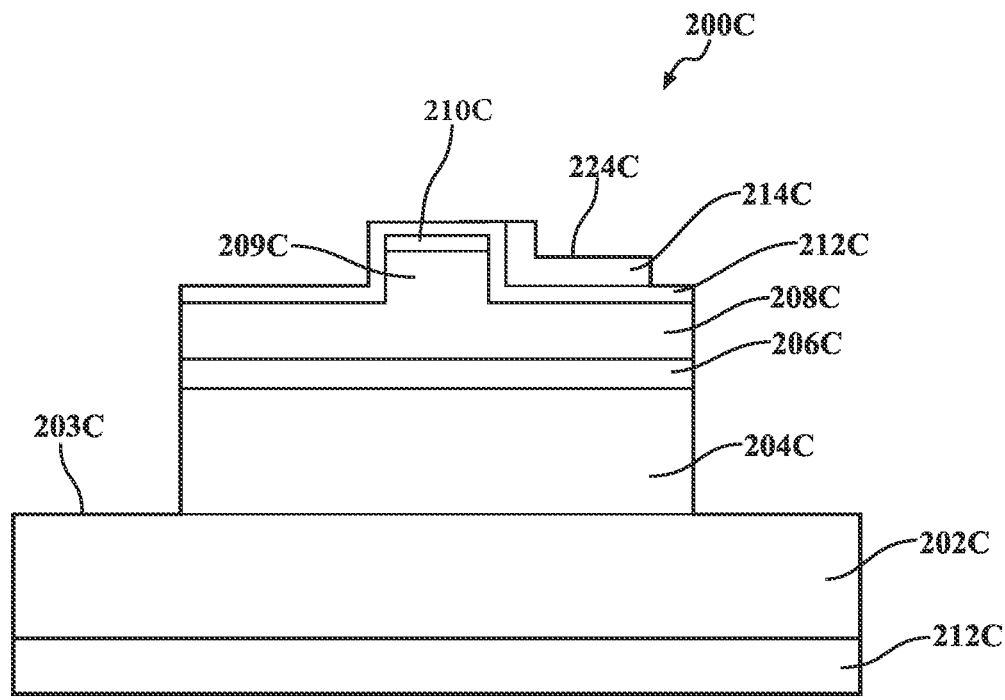
FIG. 16 illustrates a cutaway view of the semiconductor laser of FIG. 14, generally taken along lines 16-16 of FIG. 14.

FIG. 14 illustrates an example where the conductive contact 214C includes a lengthy central portion 220C, but only includes one bond pad area. In this example, the conductive contact 214C includes the bond pad area 224C. Generally, the cross-sectional view across the length of the semiconductor laser 200C would be similar to the cross-sectional views previously shown and described in FIG. 12. Additionally, the cross-sectional view across the middle of the semiconductor laser 200C would be similar to the cross-sectional views previously shown and described in FIG. 15. However, the cross-sectional view generally taken along lines 16-16 would differ from those in the other examples generally taken along lines 10-10. Moreover, FIG. 16 illustrates a cross-sectional view generally taken along lines 16-16 of the semiconductor laser 200C. This example shows that the conductive contact 214C only includes the central portion 220C and a single bond pad area 224C.

As such, the semiconductor lasers 200A-200C illustrated in FIGS. 10-16 have pulled back portions of the central portions 220A-220C of the conductive contacts 214A-214C. By so doing, current density at the facet edges of the semiconductor lasers 200A-200C is reduced, resulting in an improvement in the breakage current. Like before, this results in a semiconductor laser with a longer operating life and improved power output compared to prior art systems.

Figure 17:
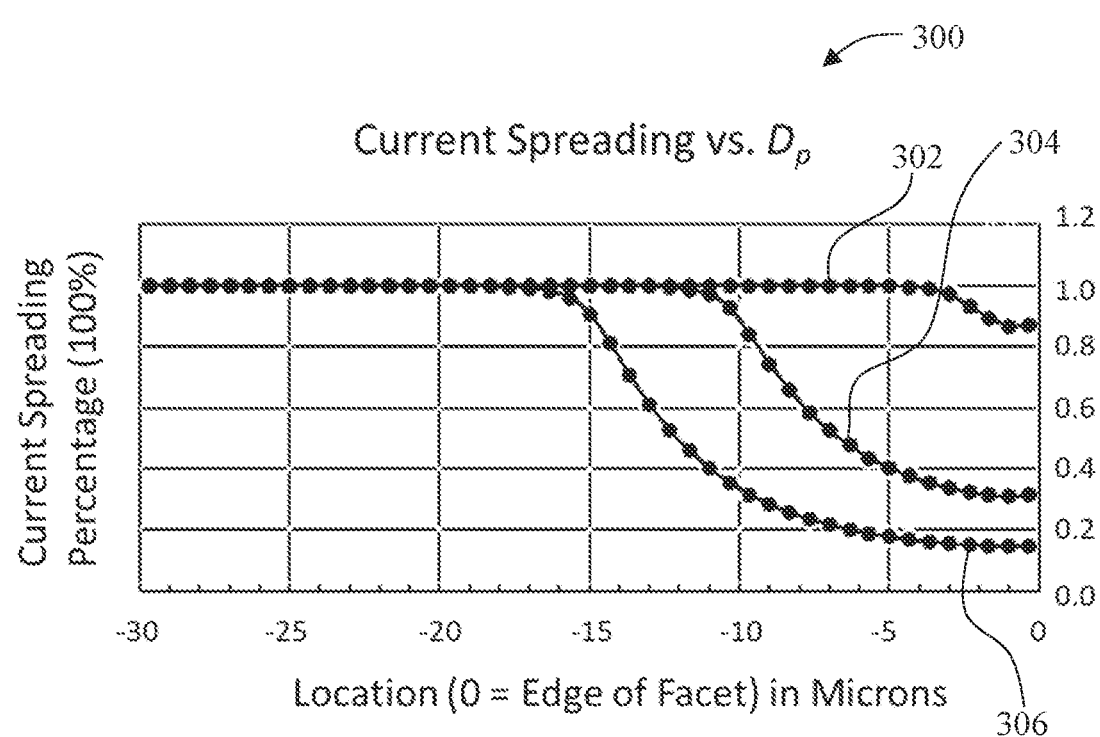
FIG. 17 illustrates a chart showing the current spreading from the edge of a facet in relation to the distance $D_p$.

To better visualize these improvements, reference is made to FIG. 17, which illustrates a chart 300 detailing current spreading from the edge of a facet towards the center of the semiconductor laser. The current spreading illustrated in FIG. 17 is applicable to any of the examples given of different semiconductor lasers in this description. The edge of the facet is at location zero (0) along the x-axis.

The chart 300 illustrates lines 302, 304, and 306. Line 302 illustrates the current spreading when $D_p$ is 5 µm. As mentioned above, $D_p$ could be the distance that a central portion of the conductive contact, such as the central portion 220A of the conductive contact 214A of the semiconductor laser 200A. However, $D_p$ could also be the distances between the edges 121A and/or 123A along the length of the contact layer 110A that is covered by portions of the dielectric layer 112A, as is the case for the semiconductor laser 100A. When $D_p$ is 5 µm, the current spreading percentage is slightly reduced at the edges of the facet and increases to 100% at approximately 4 µm from the edge of the facet.

Line 304 illustrates the current spreading when $D_p$ is 10 µm. Here, the current spreading percentage is reduced more (approximately 30%) at the edges of the facet and increases to 100% at approximately 12 µm from the edge of the facet. Line 306 takes this further and illustrates the current spreading when $D_p$ is 15 µm. Here, the current spreading percentage is reduced more (approximately 18%) at the edges of the facet and increases to 100% at approximately 18 µm from the edge of the facet.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The terms "a" and "an," as used herein, are defined as one or more than one. As used herein, the term "plurality" is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A semiconductor laser having a cavity comprising:
   a substrate;
   a first semiconductor layer, an active layer, and a second semiconductor layer sequentially adjacent to each other and arranged on the substrate;
   a contact layer arranged on the first semiconductor layer;
   a dielectric layer arranged on the first semiconductor layer;

a conductive contact arranged on the contact layer and the dielectric layer, the conductive contact having a rectangular central portion being in direct contact with the contact layer; and wherein a longitudinal length of the rectangular central portion is less than a longitudinal length of the cavity of the semiconductor laser.

2. The semiconductor laser of claim 1, wherein the longitudinal length of the central portion of the conductive contact is based on a desired power output of the semiconductor laser.

3. The semiconductor laser of claim 1, wherein a first distance is defined between a first edge of the conductive contact and a first edge of the first semiconductor layer, the first distance being between approximately 3 microns and 40 microns.

4. The semiconductor laser of claim 3, wherein a second distance is defined between a second edge of the conductive contact and a second edge of the first semiconductor layer, the second distance being between approximately 3 microns and 40 microns.

5. The semiconductor laser of claim 1, wherein the dielectric layer is arranged at least on portions of the contact layer that are not arranged between the conductive contact and the first semiconductor layer.

6. The semiconductor laser of claim 1, wherein the semiconductor laser is a ridge semiconductor laser having a ridge, wherein the central portion of the conductive contact is arranged on the ridge.

7. A semiconductor laser comprising:
a substrate;
a first semiconductor layer, an active layer, and a second semiconductor layer sequentially adjacent to each other and arranged on the substrate;
a contact layer arranged on the first semiconductor layer, the contact layer having a central portion bounded by end portions;
a dielectric layer arranged on at least one of the end portions of the contact layer and the first semiconductor layer; and
a conductive contact arranged on the contact layer and the dielectric layer, wherein the conductive contact is electrically connected to the central portion of the contact layer.

8. The semiconductor laser of claim 7, wherein a length of at least one of the end portions is based on a desired power output of the semiconductor laser.

9. The semiconductor laser of claim 7, wherein:
the end portions include a first end portion at a first end of the contact layer and a second end portion located at a second end of the contact layer; and
the first end portion has a length, defined as a distance from the central portion to a first end of the contact layer, between approximately 3 microns and 40 microns.

10. The semiconductor laser of claim 9, wherein the second end portion has a length, defined as a distance from the central portion to a second end of the contact layer, between approximately 3 microns and 40 microns.

11. The semiconductor laser of claim 10, wherein:
the conductive contact has a central area that is adjacent to the contact layer and a bond pad area that is adjacent to the dielectric layer; and
the length of the central area of the conductive contact is less than a cavity length of the semiconductor laser.

12. The semiconductor laser of claim 11, wherein a first distance is defined between a first edge of the conductive contact and a first edge of the first semiconductor layer, the first distance being between approximately 3 microns and 40 microns.

13. The semiconductor laser of claim 12, wherein a second distance is defined between a second edge of the conductive contact and a second edge of the first semiconductor layer, the second distance being between approximately 3 microns and 40 microns.

14. The semiconductor laser of claim 13, wherein the semiconductor laser is a ridge semiconductor laser having a ridge, wherein the central area of the conductive contact is arranged on the ridge.

15. A conductive contact for a semiconductor laser:
a rectangular central portion;
a bond pad that includes a first bond pad and second bond pad, the central portion being located between the first bond pad and the second bond pad;
wherein a longitudinal length of the rectangular central portion of the conductive contact is less than a cavity length of the semiconductor laser; and
wherein a pullback region is defined between edges of the central portion and the first and second bond pads, the pullback region having a length between approximately 2 microns and 40 microns.

16. The conductive contact of claim 15, wherein the first bond pad and the second bond pad have substantially similar lengths.

17. The conductive contact of claim 15, wherein the semiconductor laser is a ridge laser.

* * * * *